(12) United States Patent
Rosskopf et al.

(10) Patent No.: US 10,330,246 B2
(45) Date of Patent: Jun. 25, 2019

(54) MAGNETIC CLOSURE DEVICE

(71) Applicant: The Vitec Group PLC, Richmond (GB)

(72) Inventors: Michael Rosskopf, Tegernsee (DE); Richard Wenman, Braintree Essex (GB); Jolyon Torbitt, Suffolk (GB)

(73) Assignee: The Vitec Group PLC, Richmond (GB)

( * ) Notice: Subject to any disclaimer, the term of this patent is extended or adjusted under 35 U.S.C. 154(b) by 0 days.

(21) Appl. No.: 15/580,603

(22) PCT Filed: Apr. 11, 2016

(86) PCT No.: PCT/GB2016/050999
§ 371 (c)(1),
(2) Date: Dec. 7, 2017

(87) PCT Pub. No.: WO2016/198826
PCT Pub. Date: Dec. 15, 2016

(65) Prior Publication Data
US 2018/0156379 A1    Jun. 7, 2018

(30) Foreign Application Priority Data

Jun. 8, 2015    (GB) .................................. 1509925.2

(51) Int. Cl.
*F16M 11/32* (2006.01)
*F16M 11/34* (2006.01)

(52) U.S. Cl.
CPC ............. *F16M 11/34* (2013.01); *F16M 11/32* (2013.01); *F16M 2200/021* (2013.01); *F16M 2200/08* (2013.01)

(58) Field of Classification Search
CPC ......... F16M 11/32; F16M 11/34; F16M 11/36
See application file for complete search history.

(56) References Cited

U.S. PATENT DOCUMENTS

| 8,146,876 B1 * | 4/2012 | Young | F16B 7/1409 248/161 |
| 2011/0031358 A1 | 2/2011 | Fischer | |
| 2012/0298829 A1 * | 11/2012 | Johnson | F16M 11/36 248/440.1 |

FOREIGN PATENT DOCUMENTS

| CN | 105240671 A | 1/2016 |
| WO | 2014124669 A1 | 8/2014 |

* cited by examiner

*Primary Examiner* — Noam Reisner

(57) ABSTRACT

A tripod (1) for mounting a camera or the like is disclosed. The tripod (1) comprises a support (5) having three legs (40) which are moveably mounted at a proximal end about the support (5) and circumferentially equidistant from each other. The legs (40) are moveable between an expanded configuration to support the tripod (1) and a folded configuration when the legs (40) lie adjacent to each other. In order to retain the legs in the folded configuration, at least one leg (40) includes a magnet (11) spaced distally along the leg (40) from the support. Each of the other two legs (40) includes a further magnet (12) or a magnetically attracted portion to magnetically engage the magnet (11) and releasably retain the tripod (1) in the folded configuration.

9 Claims, 8 Drawing Sheets

MAGNETIC CLOSURE DEVICE

CROSS REFERENCE TO RELATED APPLICATIONS

This application is a national phase filing under 35 U.S.C. § 371 of International Patent Application No. PCT/GB2016/050999, filed Apr. 11, 2016, which claims priority to Great Britain Application No. 1509925.2 filed Jun. 8, 2015 both which are incorporated herein by reference in their entirety.

FIELD OF THE INVENTION

The present invention relates to a fastener or closure means particularly suitable for releasably fastening together the legs of a tripod. The fastener is especially suitable for ease of operation using only one hand and can be used whilst, for example, a camera or the like is attached to and supported on the tripod.

BACKGROUND OF THE INVENTION

Tripod mounts providing a stable support for a device such as a camera and the like are well known in the art. A typical mount has a hub or support to which the device is attached and three legs which are hingeably or otherwise attached to the support which legs, in the extended or expanded position enable the device to be maintained in an orientation sufficiently stable to allow operation of the device.

The legs are moveable between the extended position in which the support is stabilised and the retracted or folded position in which the legs are effectively parallel to each other, and which enables the tripod to be more easily transported. in the retracted position there is usually a need to secure the legs together in order to prevent their relative movement during transport, which movement could cause damage or make carriage difficult.

In a previous application by the Applicant, GB 2374529, the use of a strap, along with the disadvantages associated therewith, was described whereby a strap was utilised to bind together the legs. The invention itself disclosed in GB 2374529 comprised a mechanical latch to hold the legs together. The latch mechanism could be actuated by the user, using only one hand.

The latch mechanism disclosed has the disadvantage however, particularly given its usual location towards the foot of a tripod leg, of being easily contaminated with water and dirt ingress which can lead to wear and corrosion of the mechanism and eventually hinder its function. Furthermore, the tripod user may be required to adjust the configuration of the tripod leg via an upper locking mechanism; while simultaneously operating a lower latch mechanism for releasing or restraining the tripods legs. This simultaneous use of the lower latch mechanism is awkward and/or uncomfortable for the tripod user.

It is an object of the current invention to provide a means for securing together the legs of a tripod together which addresses the above problems.

SUMMARY OF THE INVENTION

According to a first aspect of the invention there is provided a tripod for mounting a camera or the like, said tripod comprising a support having three legs moveably mounted at a proximal end about the support and circumferentially equidistant from each other, the legs being moveable between an expanded configuration to support the tripod and a folded configuration when the legs lie adjacent to each other, at least one leg including a magnet spaced distally along the leg from the support;

each of the other two legs including a further magnet or magnetically attracted portion to magnetically engage the magnet and releasably retain the tripod in the folded configuration.

The use of magnetic attraction enables the tripod to be easily folded using only one hand and to remain in the folded configuration for transportation. When the legs need to be moved to the expanded configuration to provide a stable support for a camera or the like, this can easily be achieved by breaking the magnetic attraction between the legs.

Optionally, the or each magnet or magnetically ratted portion is located in the distal or foot region of a leg.

Preferably, the magnet is housed on a sleeve, said sleeve being attached to a leg. The use of a sleeve provides a robust and simple attachment means for a magnet and enables in certain embodiments replacement of a magnet or retrofitting of a magnet to an existing leg. Further preferably, the sleeve is demountably attached to a leg, for example by means of a screw fitment or a push-fit fitment. Alternatively preferably, the sleeve is integral with a leg.

Preferably, the sleeve attached to the at least one leg houses a first magnet and a second magnet, the first and second magnets being located on opposite sides of the at least one leg and engaging corresponding magnets or magnetically attracted portions housed on the other two legs. Further preferably, the corresponding magnet or magnetically attracted portion on each of the other two legs is housed on a sleeve housed about the leg.

Conveniently, the tripod includes three sleeves with each leg housing a sleeve, and each sleeve housing a magnet and a magnetically attracted portion, said magnets and magnetically attracted portions being so arranged that a magnet on one sleeve engages a magnetically attracted portion on an adjacent sleeve.

According to a second aspect of the invention there is provided a sleeve attachable to a tripod leg, said sleeve including a body portion, said body portion defining an aperture so sized and shaped to fit about, in contiguous engagement, a tripod leg, the sleeve including one or more magnets.

The use of such a sleeve facilitates movement of the legs into the folded configuration. Moreover, it is envisaged that a sleeve can be retrofitted to an already existing tripod leg enabling adaptation of already existing tripods or replacement of a damaged sleeve.

According to a third aspect of the invention there is provided a sleeve attachable to a tripod leg, said sleeve including a body portion, said body portion defining an aperture so sized and shaped to fit about, in contiguous engagement, a tripod leg, the sleeve including one or more magnetisable portions.

BRIEF DESCRIPTION OF THE DRAWINGS

The invention is now described with reference to the accompanying drawings which show by way of example only one embodiment of a fastener, in the drawings.

DETAILED DESCRIPTION OF THE INVENTION

In order to ensure that the legs of a tripod remain substantially parallel to each other when in the stowed or folded configuration, allowing the tripod to be more easily carried, a number of solutions has been proposed. One solution is to stiffen the joint connecting the tripod leg to the hub or support so that the leg cannot easily move to an extended configuration, at least not without force being applied by a user.

This solution however has the disadvantage that the position of the legs cannot easily be altered, especially if the device being supported by the tripod is still attached to the support and especially not such that the alteration can be achieved using only one hand—the other being used to hold the tripod and device safely.

Further solutions, as identified above utilising a strap or latch mechanism also suffer from disadvantages as set out.

The present invention seeks to address the problems through the use of an attractive magnetic force between the legs of the tripod. Such a force is sufficient to hold the legs together, but can also be tailored to be of magnitude such that the force can be easily broken when the legs need to be separated to erect the tripod. Moreover, because the mechanism binding the legs together has no moving parts, there is a lower risk of damage to the mechanism with use, especially when such use is outdoors. The current invention therefore provides a simple technical solution which is simple and durable in use.

To this end, the invention contemplates the provision of a magnet on one or more of the tripod legs which magnet then engages another magnetic or a magnetically attracted element on or incorporated into another leg. The invention is suitable for use incorporated in a tripod of conventional design which tripod comprises a support or hub to which a device such as a camera is attachable. The three legs of the tripod are attached at their proximal end to the support and such that they are circumferentially equidistant from each other about the support. It will be appreciated that the support can have a circular, triangular or other shape to suit the use and design requirements and preferences of the designer and user.

Figure 1:
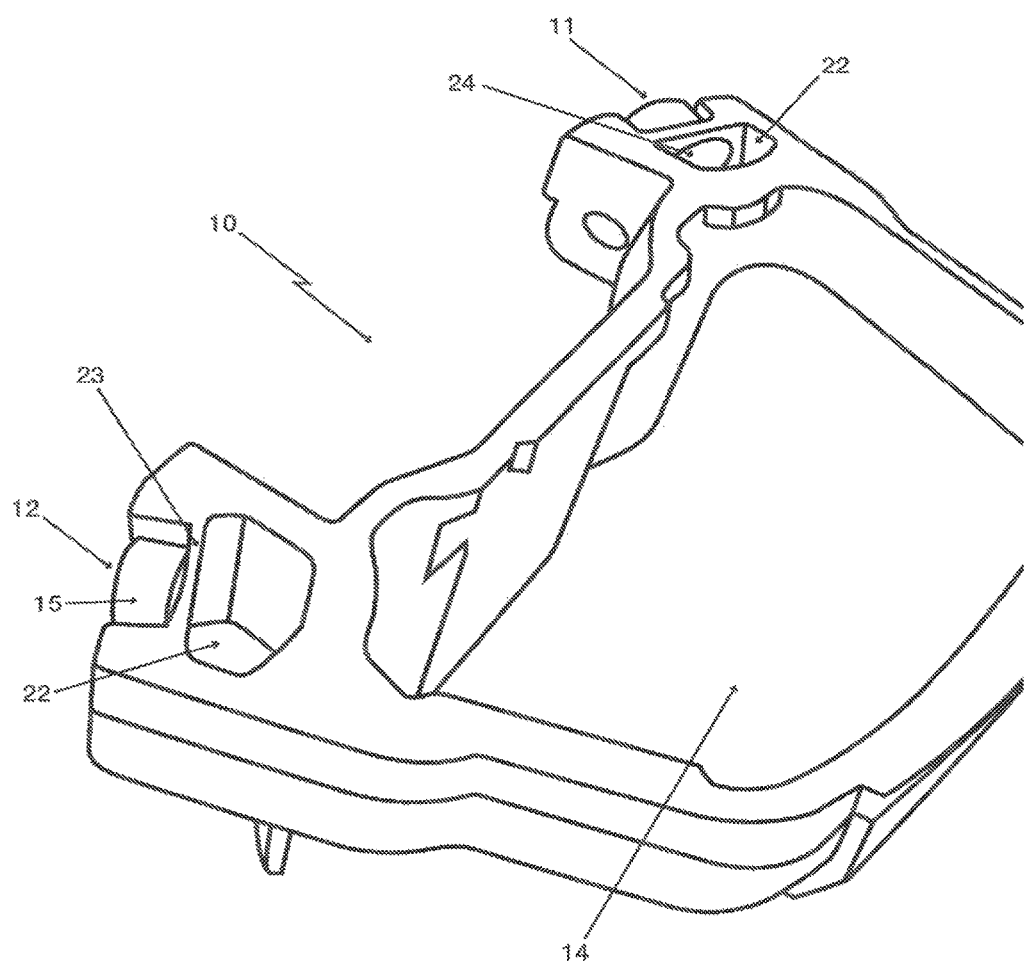
FIG. 1 is a first perspective view of a fastener sleeve.
Figure 2:
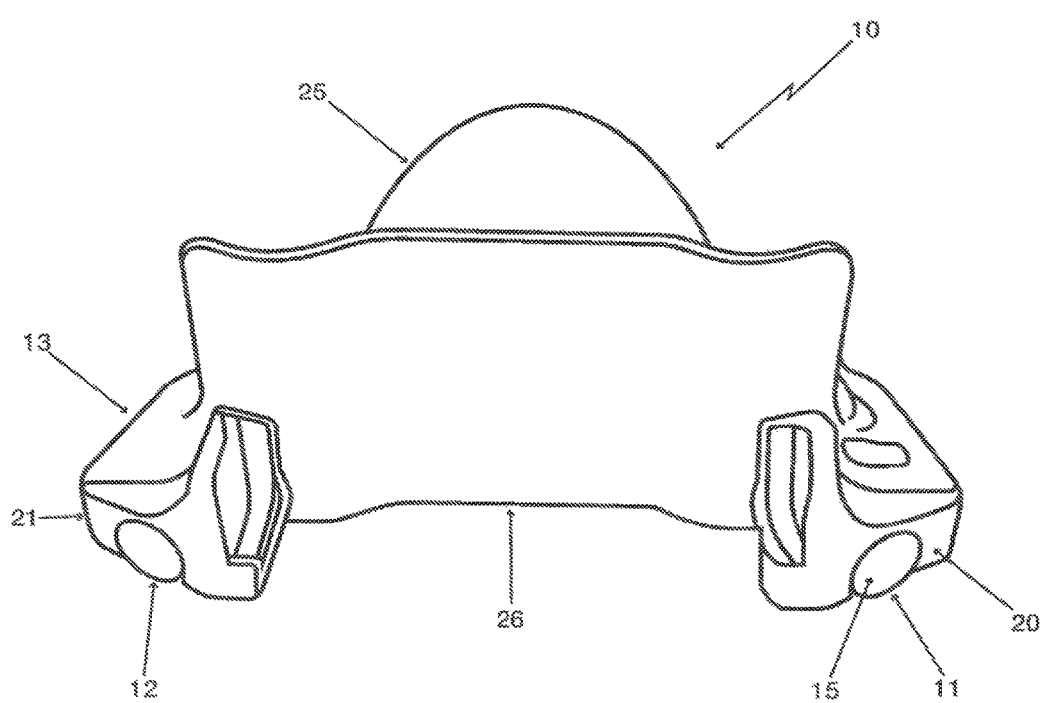
FIG. 2 is a second perspective view of a fastener sleeve.
Figure 3:
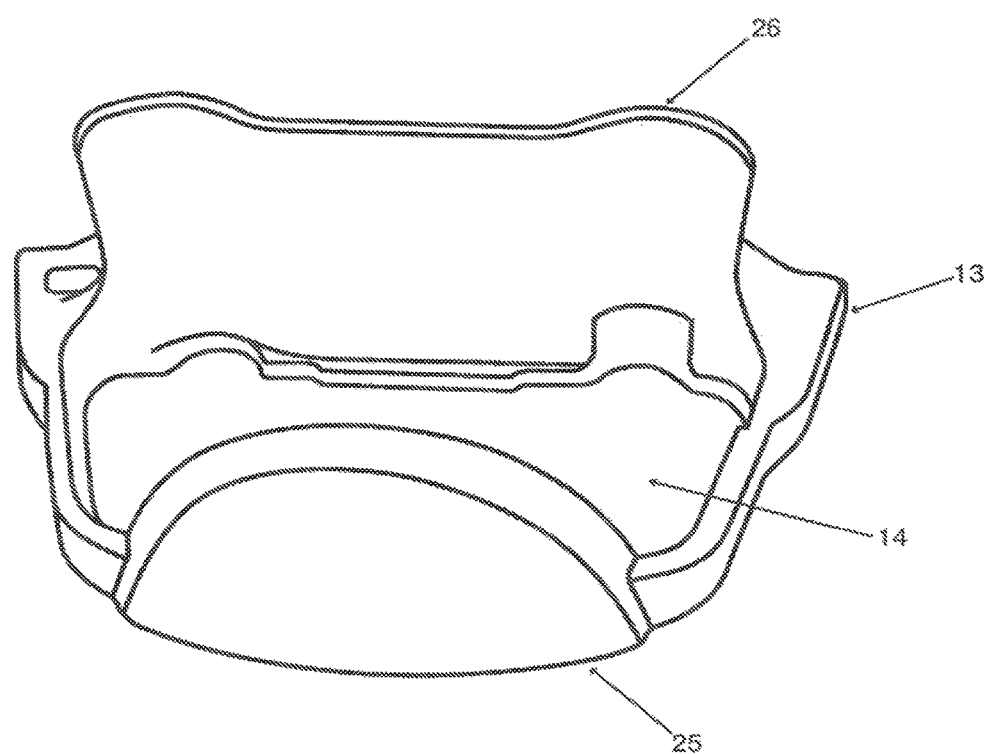
FIG. 3 is a third perspective view of a fastener sleeve.
Figure 4:
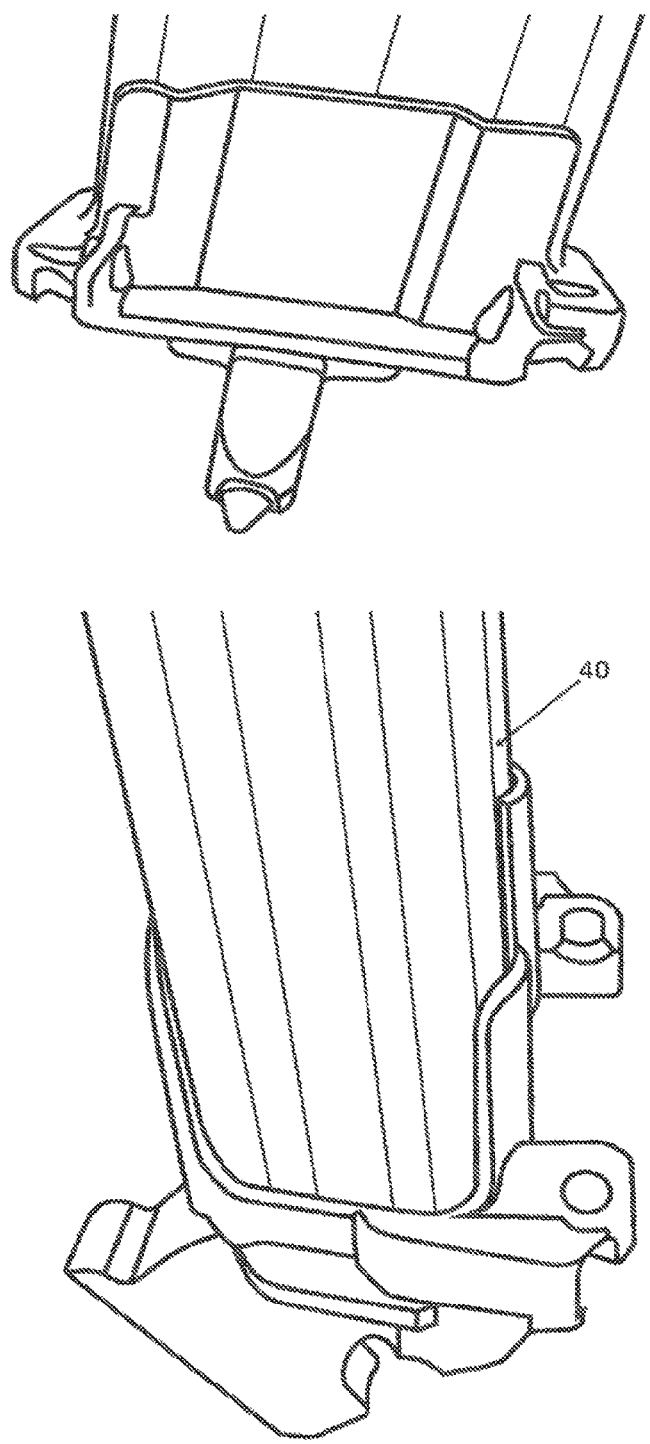
FIG. 4 is a first perspective view of a fastener sleeve attached to a tripod leg.
Figure 5:
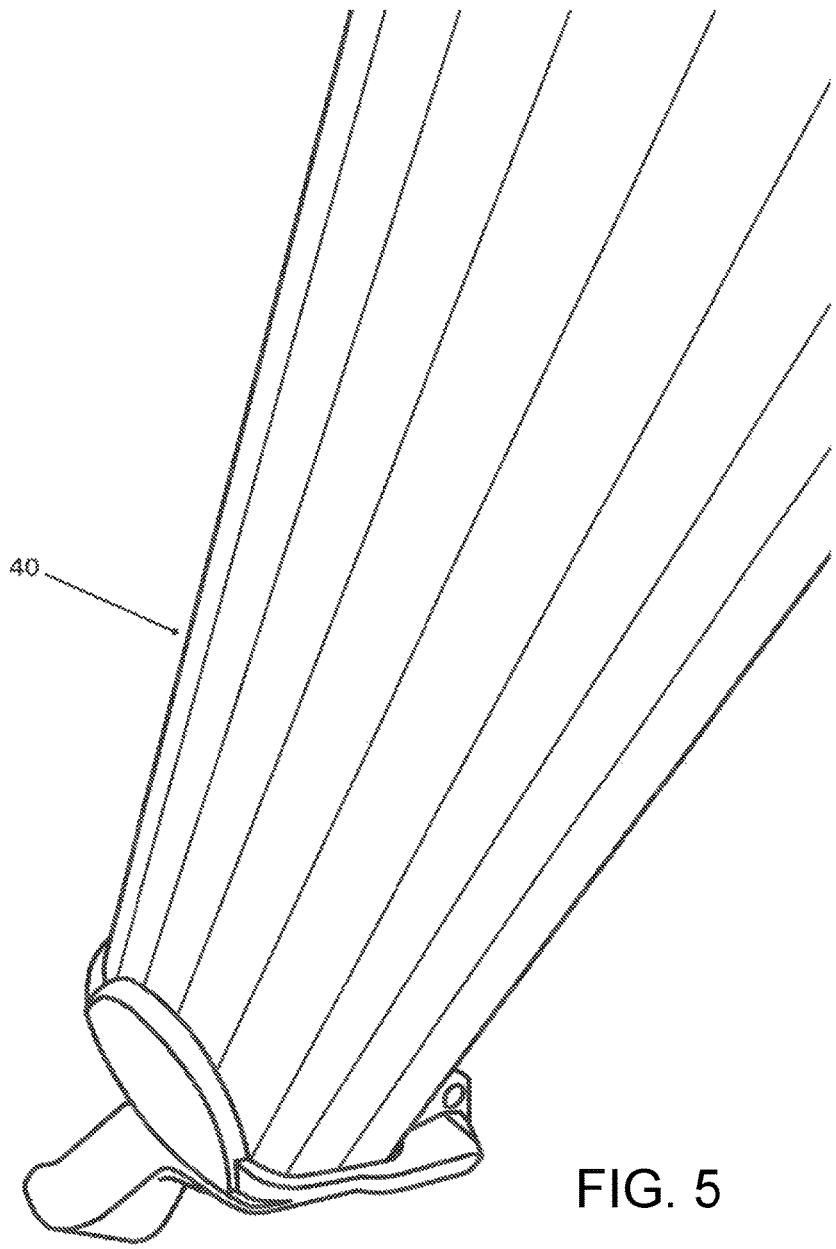
FIG. 5 is a second perspective view of a fastener sleeve attached to a tripod leg.
Figure 6:
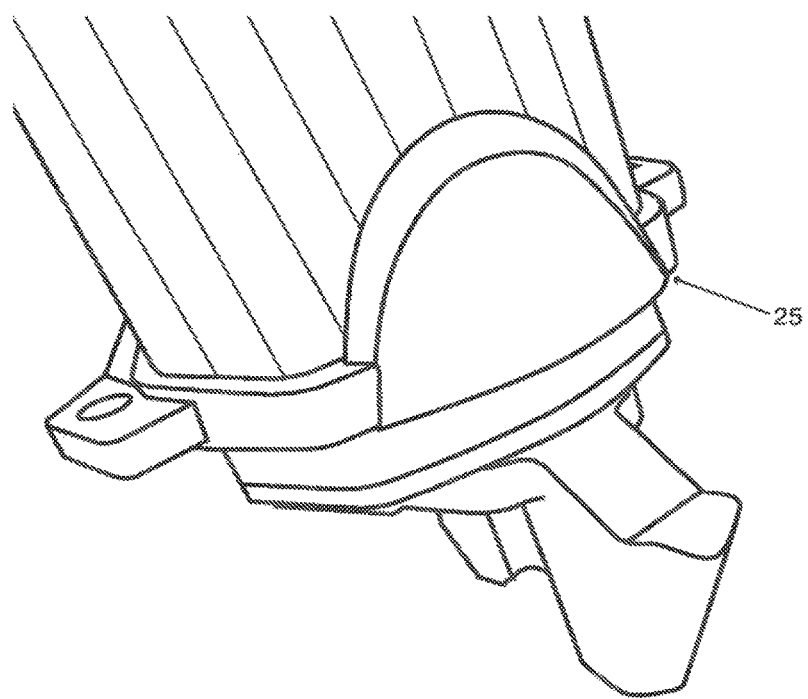
FIG. 6 is a third perspective view of a fastener sleeve attached to a tripod leg.

One embodiment disclosed herein which illustrates the invention is shown in the attached figures. In FIGS. 1 to 3 is shown a fastener sleeve, generally referenced 10, which is secured about the leg 40 of a tripod (see FIG. 8), generally referenced 1. The sleeve 10 has two magnets 11, 12 which in use can magnetically engage corresponding magnets in the sleeves attached to other legs of the tripod 1. The force generated by this engagement is sufficient to hold the legs together. However said force is of a magnitude that the user can overcome the force to separate the legs from one another when required, preferably using only one hand. Further, to assist in ensuring that the legs 40 are properly brought together and are retained together substantially parallel to each other, the magnets and/or sleeves are preferably located in the distal or foot 50 region of a leg 40.

In more detail, the sleeve 10 comprises a body 13, which includes a ring section which defines an aperture 14, the aperture 14 being so-shaped as to fit about and to the leg 40. The body 13 is formed of a robust plastics material, which enables the sleeve 10 to be formed via a relatively cost-effective moulding process. However, alternative materials such as carbon fibres can be used if desired or required.

The magnets 11, 12 which provide the magnetic attraction are located to either side of the sleeve 10. This arrangement enables the first magnet 11 to engage a magnet on a sleeve attached to the second leg of a tripod and the second magnet 12 to engage the corresponding magnet on the third leg.

Each magnet 11, 12 is retained within an aperture 15 of an arm 20, 21 which arm 20, 21 extends away from the ring section of the body 13 and, in-use towards a respective other leg of a tripod. In order to reduce the weight of an arm 20, 21 and thereby the overall weight of the sleeve 10, the arm 20, 21 is hollow in the form of a void volume 22. The magnets 11, 12 are therefore each attached to a partition 23, 24 within an arm 20, 21. The fixing in position of a magnet 11, 12 is achieved by conventional means such as an adhesive. Additionally or alternatively, the edge defining the volume 22 retaining a magnet 11, 12 can be shaped to hold a magnet 11, 12 within the volume, usually leaving the outwardly orientated face of the magnets 11, 12 clear to better engage the other leg. The surface of the magnet 11, 12 is conveniently flush with the rest of the arm 20, 21 to give better contact with another leg.

In order to increase engagement of the sleeve 10 with a leg 40, a contact portion 25 of the body 13 is extended out of the plane of body so increasing the surface area in contact with said leg 40. The opposite side 26 of the sleeve 10 is similarly extended and also profited to fit about and in contiguous relationship with the features of the leg 40. If required, a glue or screw fitment can be utilised to secure the sleeve 10 to the leg 40. This can be in the form of a screw passing through the sleeve 10 and into the leg 40 or simply a grub screw passing through and gripping the sleeve 10 and pushing against the leg 40. Alternatively, a push-fit attachment means can be used.

Figures 7A, 7B:
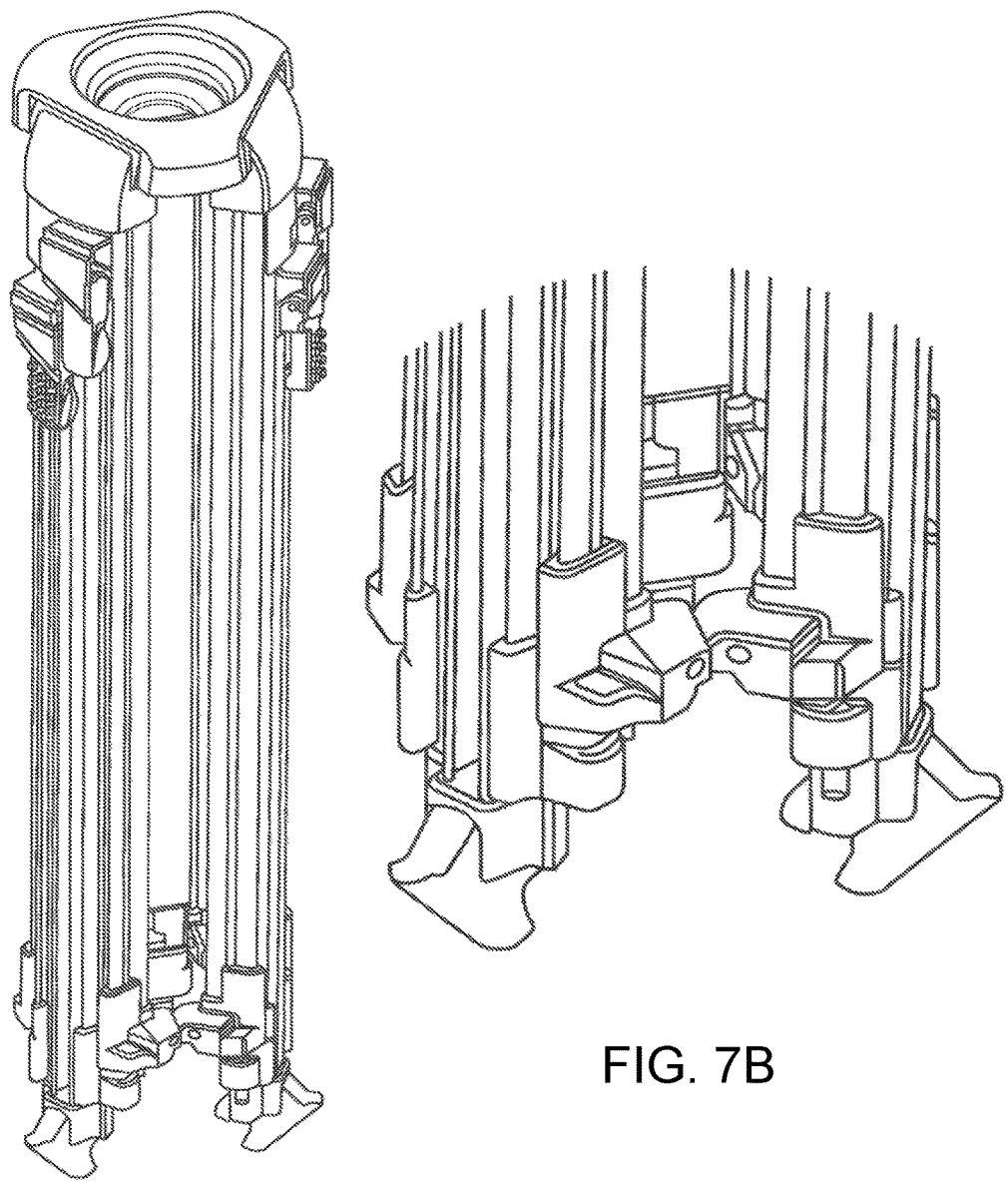
FIG. 7a is a perspective view of a closed tripod with all three legs fastened together.
FIG. 7b is a lower perspective view of three tripod legs fastened together.

FIGS. 7a and 7b show a tripod in a retracted/folded configuration, in which the magnets of each fastener are cooperating with the magnets) or magnetically attracting material of a neighbouring fastener; thereby holding the legs of the tripod in the closed/collapsed configuration.

Figures 8A, 8B:
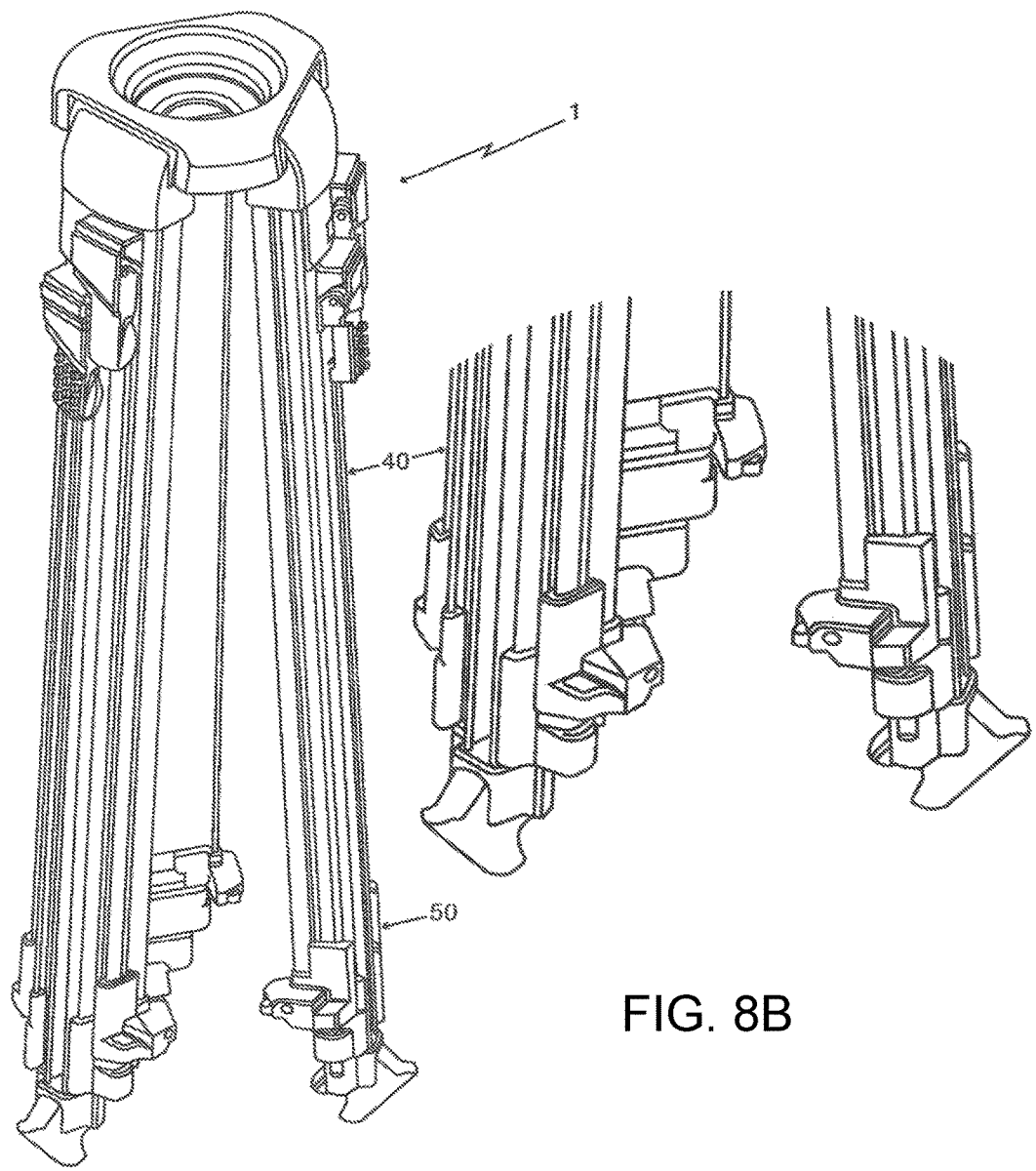
FIG. 8a is a perspective view of an open tripod with all three legs unfastened.
FIG. 8b is a lower perspective view of all three tripod legs unfastened.

FIGS. 8a and 8b show a tripod in an expanded/extended configuration, in which the magnets of each fastener are not cooperating with the magnet(s) or magnetically attracting material of a neighbouring fastener; thereby enabling the legs of the tripod to be positioned in the extended configuration, allowing the tripod to support a device in a stable manner.

In use therefore, and with the sleeve 10 as described above attached about each leg at the same level, the tripod can be deployed in that a camera is attached to the tripod support or hub 5 and the legs of the tripod extended away from each other, said legs being in contact with a surface to provide a stable temporary position for the camera.

When the tripod needs to be moved or stored away, the user simply lifts the tripod, possibly orientating the tripod horizontally if such an orientation is more comfortable, and pushes the legs towards each other. This can normally be achieved using the user's free hand. Once the legs approach each other to a certain distance, the force between magnets on adjacent legs acts to assist the user by pulling the legs towards each other to bring the legs to their final closed configuration.

The magnets then act to hold the legs in this configuration allowing the tripod to be easily moved. When the tripod needs to be subsequently set up again, the user simply pushes against the magnetic force and extends the legs into a supporting configuration.

A number of different embodiments, not illustrated, to those described above can be utilised without departing from the overall scope of the invention. Firstly, one of the magnets of a pair of engaging magnets can be replaced by a material which is attracted to a magnet such as a steel material or other metal or alloy. Additionally or alternatively, to reduce weight, the tripod can be constructed such that a sleeve is arranged about a first leg as described above, with sleeves around the other legs having only one magnet or magnetically attractive material incorporated therein to engage a magnet on the first leg. Each sleeve can include a magnet and a magnetically attractive material such that when folded a magnet on one leg engages a magnetically attractive material on the other. Further alternatively, one or more magnets or magnetically attractive material can be incorporated directly within the second and third legs. In a further embodiment, the magnet material may be in the form a bar, which is substantially in the form of a round or rectangular cylinder; whereby each end of the bar is exposed to cooperate with the magnetic material of the neighbouring fastener.

In a further embodiment, not illustrated, the first leg of a tripod has two magnets attached thereto by means of a sleeve as described above. Each of the other legs has a single magnetically attractive portion one of which on closure of the legs engages a first of the two magnets and the other the second of the two magnets.

The invention can be incorporated into a tripod as a permanent fixture with the sleeve being integrally formed as part of a leg. Alternatively, a sleeve can be removeably attached to a leg allowing a replacement to be fitted should damage occur or for a sleeve to be added retrospectively to an already existing leg.

The tripod user can adjust the tripod configuration via a manual locking mechanism incorporated within the leg; and simultaneously close the tripod legs so that the magnets/magnetic material in each fastener cooperates with the magnets/magnetic material of the neighbouring fastener(s). Therefore, when the fastener is in close proximity with a neighbouring fastener, the cooperating magnetic fields provide the technical effect of positioning and holding the neighbouring fasteners together without the tripod user having to manually align and/or operate the fastener(s).

As the sleeve is constructed from a magnetically permeable material, the magnets/magnetic material may be contained within or otherwise embedded within the sleeve material such that they remain fully protected by the sleeve from water, dirt or other substances in the environment.

It will of course be understood that the invention is not limited to the specific details ire described herein, which are given by way of example only, and that various modifications and alterations are possible within the scope of the invention.

The invention claimed is:

1. A tripod for mounting a camera or the like, said tripod comprising a support having three legs moveably mounted at a proximal end about the support and circumferentially equidistant from each other, the three legs being moveable between an expanded configuration to support the tripod and a folded configuration when the three legs lie adjacent to each other;
   at least one leg including a magnet spaced distally along the at least one leg from the support, wherein the magnet is housed on a sleeve attached to the at least one leg;
   each of the other two legs including a further magnet or a magnetically attracted portion to magnetically engage the magnet and releasably retain the tripod in the folded configuration, wherein each of the other two legs has attached an additional sleeve housing each further magnet or magnetically attracted portion;
   wherein each sleeve comprises a body portion comprising a ring section defining an aperture, the aperture being so shaped to fit about, in continuous engagement to the sleeve's respective leg to thereby slide the sleeve onto the leg, and
   wherein the sleeve attached to the at least one leg houses a first magnet and a second magnet, the first magnet and the second magnet being located on opposite sides of the at least one leg and engaging one or more corresponding magnets or magnetically attracted portions housed on the other two legs.

2. The tripod according to claim 1, wherein each magnet or magnetically attracted portion is located in a distal or foot region of each leg.

3. The tripod according to claim 1, wherein each sleeve is demountably attached to each leg, by one of: a screw fitment; or a push-fit fitment.

4. The tripod according to claim 3, wherein each sleeve includes a contact portion extending from the body portion and out of a plane of the body portion.

5. The tripod according to claim 1, wherein each sleeve is integral with each leg.

6. The tripod according to claim 1, wherein the one or more corresponding magnets or magnetically attracted portion on each of the other two legs are housed on the sleeves housed about each of the other two legs.

7. The tripod according to claim 6, wherein the tripod includes three sleeves with each of the three legs having one of the one or more sleeves attached thereto, and each sleeve housing the magnet and the magnetically attracted portion, each magnet and magnetically attracted portion being so arranged that the magnet on one sleeve engages the magnetically attracted portion on an adjacent sleeve.

8. The tripod according to claim 1, wherein each sleeve includes an arm attached to the body portion, the arm including a magnet retaining aperture.

9. The tripod according to claim 8, wherein the aperture includes a partition the magnet being attached to the partition.

* * * * *